June 3, 1969     H. BURKART ET AL     3,447,568
ELECTROMAGNETICALLY OPERATED SEQUENTIAL VALVES
Filed July 18, 1966
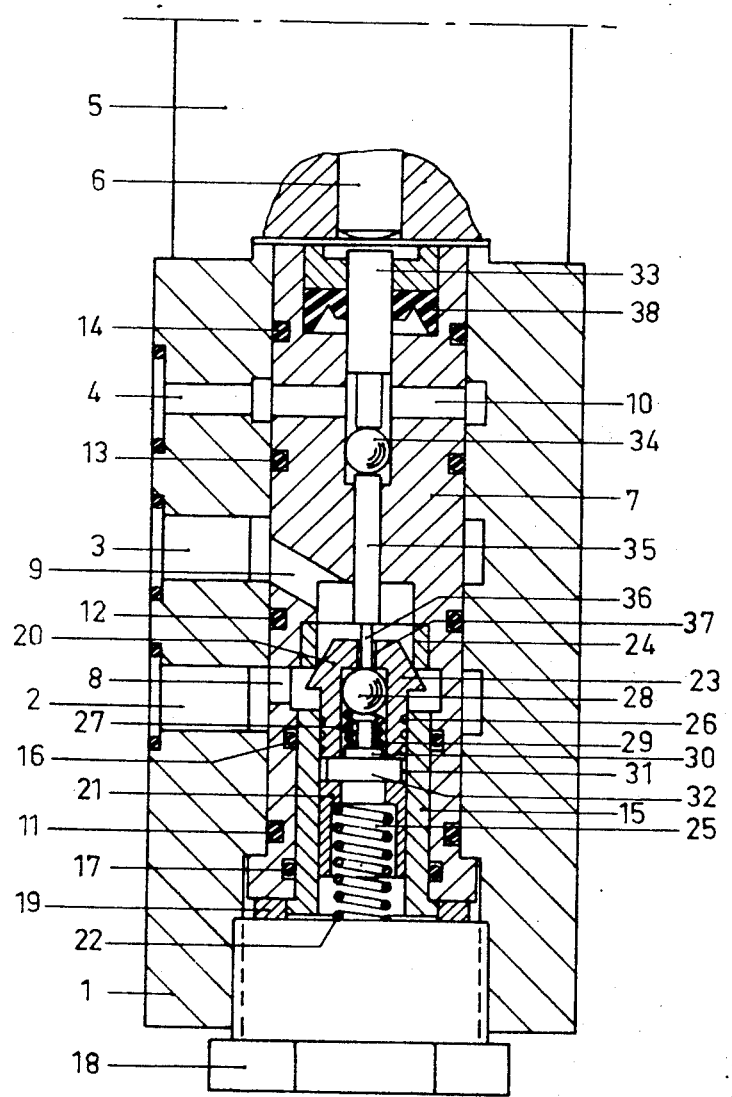
Inventors
Hermann Burkart
Harro Dorner
Werner Bayersdorfer
By Stevens, Davis, Miller & Mosher
Attorneys United States Patent Office 3,447,568
Patented June 3, 1969

3,447,568
ELECTROMAGNETICALLY OPERATED SEQUENTIAL VALVES
Hermann Burkart, Adalbert-Stifter-Str. 8, and Harro Dorner, Balthasar-Neumann-Str. 1, both of 8603 Ebern, Germany, and Werner Bayersdorfer, Nr. 46, Pfaffendorf 8601, Kreis Ebern, Germany
Filed July 18, 1966, Ser. No. 565,773
Claims priority, application Germany, July 20, 1965, K 56,665
Int. Cl. F16k *11/02*
U.S. Cl. 137—630.13    4 Claims

ABSTRACT OF THE DISCLOSURE

A solenoid shutoff valve capable of passing a large fluid volume therethrough, and which is particularly useful in automotive hydraulic systems, characterized by having a movable main valve body with a solenoid actuated relief valve mounted in the valve body. The solenoid sequentially actuates the relief and main valves to equalize pressures before fully opening the latter valve.

---

The present invention relates to an electromagnetic shutoff valve capable of passing large volumes of fluid therethrough particularly for use in hydraulic systems of vehicles.

The traditional solenoid actuated hydraulic shutoff valves for high rates of flow require, in the case of direct control, relatively large solenoids of large structural size and high current consumption. In the case of indirect control, this high current consumption is avoided since the main valve, which is designed for passing the desired fluid volume, is hydraulically actuated by a servovalve which in itself has only a small fluid passage and can be operated with low actuating power. This known construction of hydraulic shutoff valves, to be sure, allows for a relatively small structural size of the solenoid but results in an increase in the structural size of the valve. Furthermore, it is known that the use of strong solenoids with large current consumption and of extensive structural size can be avoided by developing such valves as slide valves, the balanced pistons of which require only a slight actuating force. In these apparatus, there is the disadvantage that oil leakage losses necessarily occur, which losses are undesirable particularly when using the valves in combination with hydraulic storage systems.

The requirement of small structural size, low weight, and, at the same time, of low power consumption for shutoff valves exists particularly in the case of hydraulic systems which are not in constant use, for instance, in an automotive vehicle steering system. It is necessary in practically all cases to also satisfy the condition that the actuating force and thus the power consumption of the solenoid remain approximately the same within a wide temperature range of from about −40° C. to about +100° C., which is easier with small solenoid units than with larger ones. Accordingly, an object of the present invention is to eliminate the aforementioned disadvantages and to provide a shutoff valve which takes the above requirements into account and is thus particularly suitable for use in hydraulic systems of automotive vehicles.

This object is accomplished in the invention by providing a solenoid shutoff valve with high volume capabilities in which the movable valve body is sealed off with respect to the stationary guide sleeves, in a known manner, on its guide shaft by labyrinth grooves and is provided in its inner cavity with a relief valve. Thus, the cross section enclosed by the relief valve is advantageously greater than the slippage oil cross section between the guide shaft of the valve body and the guide sleeve. In accordance with another characteristic feature of the invention, the space below the valve body, which is shut off by the relief valve and is in communication with the storage pressure line via the slippage oil cross section, is liquid tight with the discharge of the slippage oil taking place into the operating line upon the opening of the relief valve. In a further advantageous development of the invention, in order to seal off the actuating tappet for the relief valve and the valve body from the solenoid, there is provided a closure valve which is closed when the valve body is opened and pushed back. In an open condition the closure valve provides communication to a leakage oil line to which the valve of the invention is connected in addition to its connection to a storage pressure line and the operating line. Instead of a closure valve, the sealing off of the actuating tappet from the solenoid can be also effected by an O-ring.

The means for accomplishing the foregoing objects and other advantages, which will be apparent to those skilled in the art, are set forth in the following specification and claims and are illustrated in the accompanying drawing dealing with a basic embodiment of the present invention. Reference is made now to the drawings, the sole figure of which is a longitudinal section through the shut off valve of the invention.

As can be noted from the drawing, the valve housing 1 can be connected via connecting holes 2, 3, and 4 with a storage pressure line, an operating line, and leakage oil line, respectively. The lines have been omitted from the drawings for the sake of clarity. On the valve housing 1 there is arranged a solenoid valve 5 with a movable core 6. Within the housing 1 there is arranged an insert 7 which is provided with boreholes 8, 9, and 10 which represent continuations of the connecting holes 2, 3, and 4. The seal between the connecting holes 2, 3, and 4 and boreholes 8, 9, and 10 is effected by O-rings 11, 12, 13, and 14.

In the half of the insert 7, located opposite the solenoid 5, there is inserted a guide sleeve 15 which is sealed from the insert 7 by O-rings 16 and 17. The inside of the sleeve 15 is closed off from the outside by a threaded plug 18 screwed into the valve housing 1. Between the plug 18, the insert 7, and the guide sleeve 15, there is provided an annular washer 19.

A valve body 20 has a shank 21 guided in the sleeve 15 at the end opposite plug 18. The frustoconical head 23 of the valve body 20 is biased by a closure spring 22 against the valve seat 24 which is force fitted into the insert 7. The closure spring 22 is guided in a borehole 25 in the valve body 20. On its outer surface, the shank 21 is provided, over approximately half its length adjacent the head 23, with labyrinth grooves 26. Another borehole 27 in the valve body 20 forms a continuation of the borehole 25 but is of smaller diameter. A relief valve consisting of a ball 28 biased by spring 29 is arranged within borehole 27. The spring 29 rests on the side facing away from the ball 28 against a spring guide part 30 which, in its turn, rests on a bolt 32 arranged in a transverse hole 31 in shank 21 below the labyrinth grooves 26.

The moveable core 6 of the solenoid 5 acts via an actuating member 33, ball 34, and actuating tappet 35, both on the relief valve and on the valve body. For this purpose there is provided, on the tappet 35, a projection of small diameter 36 by means of which the tappet extends through a third borehole 37 in the valve body 20 which adjoins the borehole 27 and has a smaller diameter than the latter. A packing ring 38 is provided to seal off the actuating member 33 from the solenoid 5.

The manner of operating the inventive shutoff valve is described in further detail below. In the closed position shown in the drawing, the head 23 of the valve body 20 closes off the passage between the storage pressure line and the operating line. The slippage oil passing between the guide shaft 21 and the guide sleeve 15 is collected in the inside of the guide 15, which is closed off in a liquid-tight manner. The ball 28 is spring biased by spring 29 to close the borehole 37 in the valve body.

Upon energization of the solenoid, the movable core 6 presses the actuating member 33, ball 34, and tappet 35 downwards. The relief valve will be opened by the extension 36 first since this requires only a small amount of force. The pressure is thus equalized between the upper and lower sides of the valve body 20. The oil which is below the valve body will not discharge through the borehole 10 and connecting hole 4 to the leakage oil line but rather will discharge through the borehole 9 and connecting hole 3 into the operating line. The valve body 20, when completely relieved of pressure, will be opened against the biasing action of closing spring 22 by the continuing force of the solenoid.

In order to assure that the valve body 20 is pushed back rapidly and completely against the action of the closure spring 22, the cross section which is released by the relief valve, i.e., the cross section of the annular gap defined by the borehole 37 and the extension 36, is advantageously larger than the slippage oil cross section present between the guide shank 21 of the valve body and the guide sleeve 15.

The slippage oil, which is produced at the actuating tappet 35, is held back by the ball 34 when the main valve is opened, i.e., when the valve body 20 is pushed back. The ball 34 constitutes a closure valve for the borehole in the insert 7 in which the actuating tappet 35 travels. The amount of slippage oil produced at this place, during the actuating process and which at that time is still not intercepted by the closure valve 34, is only slight and is taken up by the leakage oil line via the borehole 10 and connecting hole 4. In the closed condition of the main valve, slippage oil can possibly also flow into the leakage oil line when the closure valve 34 is opened.

What is claimed is:

1. A solenoid shutoff valve capable of passing therethrough large volumes of fluid particularly for use in hydraulic systems of vehicles comprising a valve casing having valve seat means formed therein, means for connecting said valve casing to a storage pressure line, to an operating line and to a leakage discharge line, a main valve means mounted in said casing and having a relief valve means incorporated therein, spring means biasing said main valve and relief valve against valve seat means in the closing direction, said main valve being adapted to selectively interconnect said storage pressure line and operating line, said relief valve means being provided to interconnect a chamber formed by said main valve to said operating line, solenoid means mounted on said casing opposite said valve seat means, valve stem means responsive to said solenoid for sequentially actuating said relief valve and said main valve respectively to first equalize the pressures on said main valve and then move said main valve to the open position, ball valve means arranged in a counterbore guiding said valve stem and leading to said leakage line, which ball valve means is in closed position when said main valve is in opened position to prevent leakage into said leakage line of the fluid flowing from said storage pressure line to said operating line, and which ball valve means is in opened position when the main valve is closed to equalize the pressures between the operating line side of said main valve and said leakage line thereby making it possible to shut the main valve at once.

2. A solenoid shutoff valve according to claim 1 in which said ball valve means comprises a ball disposed between a plunger connected to said solenoid and said valve stem operating said main valve and relief valve, said ball being biased against a valve seat when the main valve is in opened position.

3. A solenoid shutoff valve according to claim 1 in which said relief valve comprises a ball biased by spring means against a valve seat provided in the main valve, said spring means being engaged by a plate member which is kept in position by means of a pin arranged in a transverse bore through a downwardly directed extension of said main valve.

4. A solenoid shutoff valve according to claim 1 in which said main valve is biased by a compression spring against its valve seat.

References Cited

UNITED STATES PATENTS

| | | | |
|---|---|---|---|
| 2,213,488 | 9/1940 | Dowrick | 137—630.15 |
| 2,265,496 | 12/1941 | Shaw | 137—630.15 X |
| 2,413,622 | 12/1946 | Harding | 137—629 X |
| 2,694,405 | 11/1954 | Field | 137—630.14 X |
| 3,213,887 | 10/1965 | Angelery | 137—630.15 |
| 3,332,445 | 7/1967 | Allen | 251—130 X |

CLARENCE R. GORDON, Primary Examiner.

U.S. Cl. X.R.

137—630.15